INVENTORS:
JOSEPH W. BOYD,
MYRON H. BENGSON

ATTORNEY

United States Patent Office 3,560,847
Patented Feb. 2, 1971

3,560,847
APPARATUS AND PROCESS FOR DETECTING LIVE BACTERIA
Joseph W. Boyd, Devon, and Myron H. Bengson, King of Prussia, Pa., assignors to General Electric Company, a corporation of New York
Filed Apr. 19, 1968, Ser. No. 722,780
Int. Cl. G01n 27/00
U.S. Cl. 324—71        8 Claims

ABSTRACT OF THE DISCLOSURE

Process and apparatus for detecting the presence of live bacteria in a fluid involves establishing, in a non-moving portion of the fluid, a current path, at least a segment of which is restricted in cross sectional area, increasing the electrical potential along the restricted current path and measuring any sudden resistance change in the restricted current path responsive to the presence therein of live bacteria.

INTRODUCTION

This invention pertains to a process and apparatus for sensing, almost instantaneously, the presence of a live bacteria in a very small fluid sample space. More specifically, it relates to an electronic counter for live bacteria.

BACKGROUND OF THE INVENTION

It is well known that if one causes an electrically conductive fluid to flow through a small orifice in an electrically non-conductive barrier while passing an electrical current through the same orifice, particles, bacteria, etc. having a different electrical conductivity than the fluid, affect the electrical conductivity through the orifice and cause an instantaneous resistance change. By counting each such resistance change electronically and correlating it with the rate of fluid flow through the orifice, one can determine the concentration of such particles, bacteria, etc. in the fluid.

Obviously, the size and disparity in conductivity of the particles, bacteria, etc., as compared with the fluid in which they are contained, will affect the extent and nature of the resistance change which they cause. It has been observed for example that live bacteria appear to respond peculiarly in such systems and, in particular, that such response seems to vary with the magnitude of the current in the test apparatus. Curby, Swanton and Lind, in the Journal of General Microbiology (1963), volume 32, pages 33–41 refer to this phenomena as electro-motive force (E.M.F.) sensitivity. The suggestion that this current-dependent response of "viable bacteria" may be utilized to assess the viability of bacterial population was made by Swanton, Curby and Lind in another article, published in volume 10, No. 5 (September 1962), at page 480, of Applied Microbiology.

Despite these preliminary observations and suggestions, there has heretofore been no electronic counter capable of differentiating between live and dead bacteria. In fact, there is no known process for determining either the presence, in a small sample, or the concentration, in a large sample, of live bacteria which does not require relatively lengthy and complex laboratory procedures.

It is therefore an object of the present invention to provide apparatus capable of electronically detecting live bacteria.

It is another object of the invention to provide an electronic counter capable of distinguishing between live bacteria and dead bacteria, inert particles, etc. in the same size range.

A further object of this invention is to provide a simplified and expeditious method of determining the live bacteria content of fluids.

BRIEF DESCRIPTION OF THE INVENTION

These and other objects are met, in accordance with the present invention, by a sensor having a pair of electrodes, adapted to establish a current path through a non-moving volume of fluid, with means to restrict the cross sectional area of the current path or a segment thereof, means to increase the electrical potential along the restricted current path or path segment and means to measure instantaneous changes in resistance along the current path as the electrical potential is increased. Typically this sensor includes a fluid vessel, with means for intermittently discharging fluid and refilling the vessel. Within the vessel, a pair of electrodes is provided for establishing a current path in the fluid. Means external to the vessel provide an increasing electrical potential across a critical volume in and near the restricted current path. Interposed between the electrodes is an electrically non-conductive barrier with an orifice having a diameter generally less than 50 times that of bacteria to be sensed. The current path necessarily passes through the orifice and its cross sectional area is restricted at that point. In and near this orifice is the critical volume.

The process of analyzing a fluid for live bacteria, in accordance with the present invention, comprises causing an electrical current to flow through a non-moving portion of the fluid to be analyzed for live bacteria while restricting the cross sectional area of the electrical current path or a segment thereof. The electrical potential across the current path restriction is then increased to detect any live bacteria in the current path in and near the restriction by measuring instantaneous resistance changes exhibited by the current path as a result of resistivity changes of live bacteria contained therein.

If this measurement is made a statistically significant number of times, one can estimate the concentration of live bacteria in the fluid. This requires means for periodically changing the fluid sample in the restricted current path and increasing the voltage thereon after a new fluid sample has been introduced and its movement stopped. For this purpose, the preferred form of the present invention includes a sawtooth generator, for cyclically increasing the voltage along the restricted current path and then decreasing it, and a reciprocating piston pump, for cyclically pumping fluid into and discharging fluid from the path of the electrical current. The return or non-pumping phase of the reciprocating piston pump is controlled so that it coincides with the increasing voltage phase of the sawtooth generator output.

DETAILED DESCRIPTION OF THE INVENTION

While the specification concludes with claims particularly pointing out and distinctly claiming the subject matter of the present invention, this invenion may be better understood from the following description, taken in conjunction with the following drawings, in which:

Figure 1:
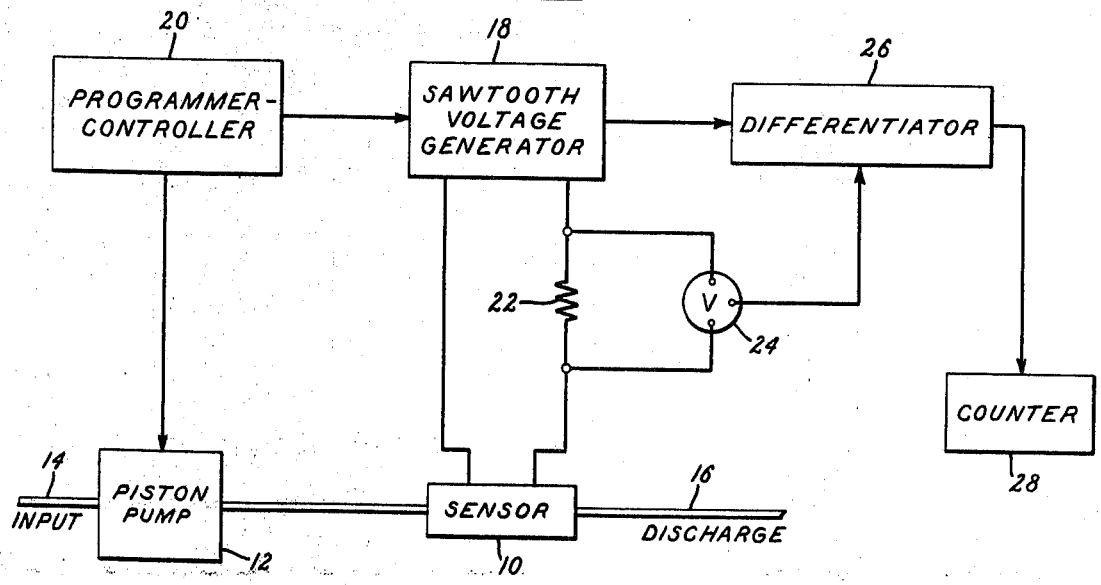
FIG. 1 is a schematic view of apparatus comprising the preferred form of the present invention.

Referring now to FIG. 1, there is shown a sensor 10, described more fully hereinafter, a reciprocating piston pump 12 which delivers fluid to be analyzed for live bacteria from an input 14 through sensor 10 to a discharge 16. In the normal operation of the piston pump 12, the delivery of test fluid to sensor 10 is cyclical, i.e. it occurs in periodic intervals between which the test fluid in the system is at rest. During these intermittent rest periods, the piston is on its return stroke and sensor 10 is activated for the detection of live bacteria, also as described more fully hereinafter.

Other parts of the apparatus shown in FIG. 1 include a sawtooth voltage generator 18 for periodically increasing the electrical potential in sensor 10 through a predetermined range. Programmer/controller 20 coordinates the sawtooth voltage generator 18 with piston pump 12 so that the period of increasing voltage in sensor 10 coincides with the return stroke of piston 12 and the period therefore when the fluid in sensor 10 is at rest. A resistor 22 in series with sensor 10 and sawtooth generator 18, together with a voltmeter 24 across resistor 22, are used to measure instantaneous resistance changes in sensor 10. Differentiator 26 signals and counter 28 registers each time the rate of change of voltage across resistor 22 undergoes a sudden change. For this purpose, such changes which are the direct result of the periodically changing voltage output of sawtooth voltage output of sawtooth voltage generator 18 are blanked out in the differentiator-counter system.

While the apparatus associated with sensor 10 in the preferred form of the present invention, as shown in FIG. 1, is suitable for the repetitive measurements necessary for reliable statistical approximation of the live bacteria content in a fluid, it should be obvious that other means may be equally suitable for performing the functions of certain parts of the apparatus. For example, an automatically controlled valve may be used to effect the intermittent delivery of fluid to sensor 10 in phase with sawtooth voltage generator 18, instead of reciprocating piston pump 12. Also, numerous sensors in parallel may be used to increase the number of individual measurements which may be made in a given time period.

Figure 2:
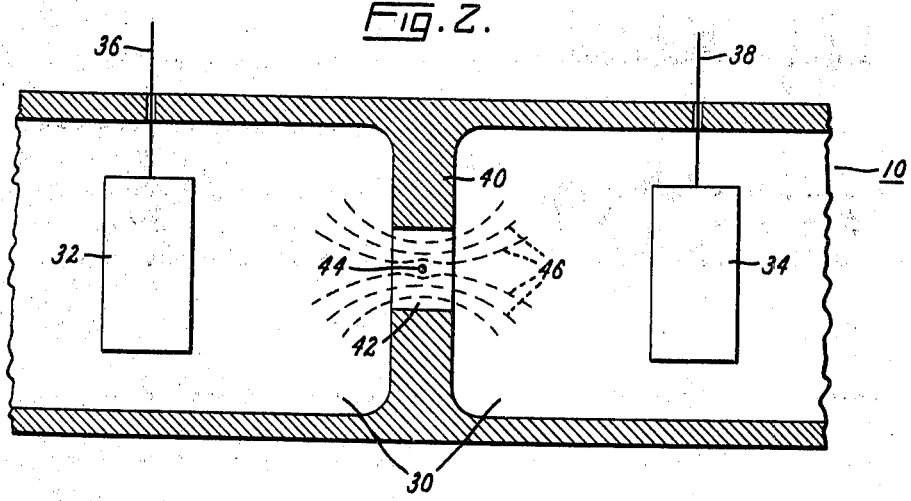
FIG. 2 is an enlarged sectional view of one part of the apparatus shown in FIG. 1.

Referring now to FIG. 2, there is shown an enlarged, sectional view of sensor 10 in FIG. 1. More specifically, there is shown a test fluid chamber 30 housing a pair of electrodes 32 and 34 with leads 36 and 38 from sawtooth voltage generator 18. Interposed between electrodes 32 and 34 is electrically non-conductive barrier 40 with an orifice 42 having a diameter not more than fifty times that of a bacteria 44 to be sensed. Lines 46 generally indicate the current path between electrodes 32 and 34 at the point of the restriction in that path caused by barrier 40.

Typically, the distance between electrodes 32 and 34 in sensor 10 is on the order of a few inches or less. An orifice with a diameter about 25 microns in a generally circular configuration is suitable for most bacteria. The fluid to be analyzed for live bacteria has a conductivity of about 0.01 mhos/cm. Normally, the test fluid is water to which is added an electrolyte, such as sodium chloride, to raise its conductivity to the desired level. The electrical potential between electrodes 32 and 34 is periodically varied from about 0 volt to about 30 volts while the test fluid in chamber 30 is at rest. At some electrical potential within this range live bacteria in the proximity of orifice 42, apparently suffer a breakdown in their ability to withstand ionic flow through their outer membrane and the resistance of the path between electrodes 32 and 34 is momentarily changed as a result thereof.

In lieu of barrier 40 with orifice 42 in sensor 10, a very small point electrode may be used to provide a current path terminus. As the current is collected on such an electrode, the cross sectional area of its path is restricted. Functionally this restricted current path is used in the same way as that provided by orifice 42 and barrier 40.

Figure 3:
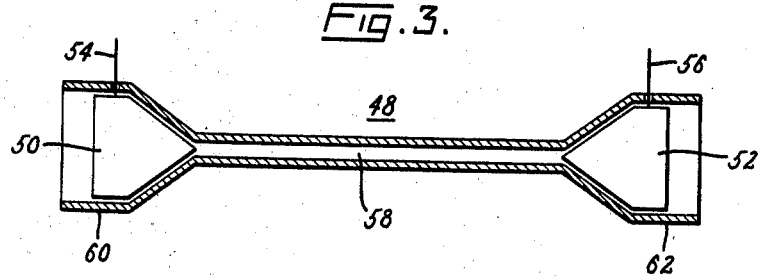
FIG. 3 is an enlarged sectional view of an alternative form of the sensor shown in FIG. 2.

Another alternative to the form of the sensor shown in FIG. 2 is shown in FIG. 3. In this form of the invention, sensor 48 comprises electrodes 50 and 52 with leads 54 and 56. Electrodes 50 and 52 are disposed at either end of a restricted diameter fluid vessel 58 so that the current path between the electrodes is restricted in cross sectional area throughout its length. Fluid inlet 60 and outlet 62 completes sensor 48, which in external circuitry and components is otherwise similar to that described with respect to sensor 10 in FIGS. 1 and 2.

While the mechanism of the breakdown of live bacteria due to the application of a voltage apparently exceeding that which the bacteria can withstand is not clear, it is known that the outer membranes of a live bacteria maintain an ion concentration difference between the inside and outside of the bacteria. This enables the bacteria to retain a number of ionic constituents necessary for its viability and precludes the migration of these constituents to surrounding fluid having lower ionic concentrations. The ability of the bacteria membrane to do so apparently fails when the electrical potential across the bacteria exceeds a certain level. Thus the ions within the bacteria begin to carry current by ion migration across the bacteria membrane, effecting a conductivity or resistance change in the small space occupied by and surrounding the bacteria. It is this supposed effect which is utilized to detect the presence of live bacteria in the process and apparatus of the present invention.

While the present invention has been described with reference to particular embodiments thereof for purposes of clarity and convenience, it should be understood that numerous modifications may be made by those skilled in the art without departing from the invention's true spirit and scope.

What we claim as new and desire to secure by Letters Patent of the United States is:

1. Apparatus for detecting the presence of live bacteria in a fluid comprising
    (a) means for establishing a current path through a stationary portion of said fluid,
    (b) means for restricting the cross-sectional area of a segment of said path,
    (c) means for increasing the electrical potential along said restricted path to effect a resistivity change in said path responsive to the presence of live bacteria in the proximity of said restricted current path, and
    (d) means for measuring sudden resistance changes in said current path as the electrical potential along said segment is increased, wherein a sudden resistance change in the path is indicative of the presence of live bacteria as opposed to non-living matter.

2. Apparatus as recited in claim 1, wherein said current establishing means comprises a pair of electrodes in said stationary portion of fluid with an electrical potential therebetween, and said restricting means comprises a current barrier in said stationary portion of fluid interposed between said electrodes, said barrier having an orifice therein.

3. Apparatus as recited in claim 1, wherein said resistance change measuring means comprises a resistor in series with said current establishing means and a voltmeter for measuring voltage across said resistor.

4. Apparatus as recited in claim 1, wherein said resistance change measuring means includes a differentiating means for determining when the rate of change of said resistance undergoes a sudden change and a counter for automatically registering a count for each such change.

5. Apparatus as recited in claim 1, wherein said potential increasing means comprises a sawtooth voltage generator for repetitively increasing said potential from a lower preselected level to a higher preselected level and reducing it back to the lower preselected level.

6. Apparatus as recited in claim 5, further including flow control means for alternately starting and stopping a flow of said fluid through said restricted current path, such that the periods when said fluid flow is stopped coincide with periods of electrical potential increase in the output cycle of said sawtooth generator.

7. Apparatus as recited in claim 6, wherein said flow control means comprises a reciprocating piston pump.

8. A process for analyzing a fluid for live bacteria content, said process comprising:
- (a) establishing an electrical current in a path through a stationary portion of said fluid, while restricting at least a segment of said path,
- (b) increasing the electrical potential along said path to effect an instantaneous resistivity change in said restricted current path responsive to the presence of live bacteria therein,
- (c) measuring resistance changes in said restricted path responsive to the presence of live bacteria therein, wherein a sudden resistance change in the path is indicative of the presence of live bacteria as opposed to nonliving matter,
- (d) moving a different portion of fluid into said current path, and
- (e) repeating the foregoing steps until a statistically significant number of fluid portions have been tested and extrapolating the results of said repeated test to determine the probable concentration of live bacteria in said fluid.

References Cited

UNITED STATES PATENTS

| | | | |
|---|---|---|---|
| 2,822,324 | 2/1958 | Gaylor et al. | 324—30X |
| 3,015,775 | 1/1962 | Coulter et al. | 324—71(PC) |
| 3,259,842 | 7/1966 | Coulter et al. | 324—71(PC) |
| 3,403,081 | 9/1968 | Rohrback et al. | 204—1.1 |

E. E. KUBASIEWICZ, Primary Examiner